(12) United States Patent
Talagala et al.

(10) Patent No.: US 11,748,653 B2
(45) Date of Patent: Sep. 5, 2023

(54) MACHINE LEARNING ABSTRACTION

(71) Applicant: DataRobot, Inc., Boston, MA (US)

(72) Inventors: Nisha Talagala, Saratoga, CA (US); Vinay Sridhar, San Jose, CA (US); Swaminathan Sundararaman, San Jose, CA (US); Sindhu Ghanta, San Mateo, CA (US); Lior Amar, Sunnyvale, CA (US); Lior Khermosh, Palo Alto, CA (US); Bharath Ramsundar, Fremont, CA (US); Sriram Subramanian, Dallas, TX (US); Drew Roselli, Woodinville, WA (US)

(73) Assignee: DataRobot, Inc., Boston, MA (US)

( * ) Notice: Subject to any disclaimer, the term of this patent is extended or adjusted under 35 U.S.C. 154(b) by 1400 days.

(21) Appl. No.: 16/000,807

(22) Filed: Jun. 5, 2018

(65) Prior Publication Data

US 2019/0108417 A1 Apr. 11, 2019

Related U.S. Application Data

(60) Provisional application No. 62/568,781, filed on Oct. 5, 2017.

(51) Int. Cl.
G06N 20/00 (2019.01)
G06F 9/38 (2018.01)
G06N 5/04 (2023.01)
G06F 18/23 (2023.01)
G06F 18/21 (2023.01)
G06F 18/20 (2023.01)

(52) U.S. Cl.
CPC ............... G06N 20/00 (2019.01); G06F 9/38 (2013.01); G06F 18/217 (2023.01); G06F 18/2178 (2023.01); G06F 18/23 (2023.01); G06F 18/285 (2023.01); G06N 5/04 (2013.01)

(58) Field of Classification Search
CPC .. G06K 9/6218; G06K 9/6227; G06K 9/6262; G06K 9/6263; G06F 9/38; G06F 18/217; G06F 18/2178; G06F 18/23; G06F 18/285; G06N 5/04; G06N 20/00
See application file for complete search history.

(56) References Cited

U.S. PATENT DOCUMENTS

2013/0226857 A1* 8/2013 Shim ............... H04W 4/021 706/52
2015/0019912 A1* 1/2015 Darling ............ G06F 11/3684 714/26
2016/0196504 A1* 7/2016 Allen ............... G06N 20/00 706/11

(Continued)

*Primary Examiner* — Daxin Wu
(74) *Attorney, Agent, or Firm* — Foley & Lardner LLP

(57) ABSTRACT

Apparatuses, systems, program products, and method are disclosed for machine learning abstraction. An apparatus includes an objective module configured to receive an objective to be analyzed using machine learning. An apparatus includes a grouping module configured to select a logical grouping of one or more machine learning pipelines to analyze a received objective. An apparatus includes an adjustment module configured to dynamically adjust one or more machine learning settings for a logical grouping of one or more machine learning pipelines based on feedback generated in response to analyzing a received objective.

20 Claims, 8 Drawing Sheets

(56) References Cited

U.S. PATENT DOCUMENTS

| | | | |
|---|---|---|---|
| 2016/0364608 A1* | 12/2016 | Sengupta | G06V 30/414 |
| 2017/0109646 A1* | 4/2017 | David | G06N 7/005 |
| 2017/0154139 A1* | 6/2017 | Iorio | G06N 20/00 |
| 2018/0046918 A1* | 2/2018 | Moon | G06F 9/44552 |
| 2018/0052898 A1* | 2/2018 | Allan | G06F 8/4452 |
| 2018/0165580 A1* | 6/2018 | Boyer | G06F 16/00 |
| 2018/0293511 A1* | 10/2018 | Bouillet | H04L 67/12 |
| 2019/0018866 A1* | 1/2019 | Ormont | G06F 9/3897 |
| 2019/0080250 A1* | 3/2019 | Denorme | G06N 3/0445 |
| 2019/0095785 A1* | 3/2019 | Sarkar | G06N 3/08 |

* cited by examiner

MACHINE LEARNING ABSTRACTION

CROSS-REFERENCES TO RELATED APPLICATIONS

This application claims the benefit of U.S. Provisional Patent Application No. 62/568,781 entitled "SYSTEMS AND METHODS FOR GENERATING, MANAGING, AND COLLABORATING ON ANALYTICS, MACHINE LEARNING, AND DEEP LEARNING OPERATIONS" and filed on Oct. 5, 2017, for Nisha Talagala, which is incorporated herein by reference.

FIELD

This invention relates to machine learning and more particularly relates to generating a machine learning abstraction layer for an objective.

BACKGROUND

Machine learning is being integrated into a wide range of use cases and industries. Unlike other types of applications, machine learning (including deep learning and advanced analytics) has multiple independent running components that must operate cohesively to deliver accurate and relevant results. This inherent complexity makes it difficult to manage all the interdependent aspect of a machine learning system.

SUMMARY

Apparatuses, systems, program products, and method are disclosed for machine learning abstraction. An apparatus, in one embodiment, includes an objective module configured to receive an objective to be analyzed using machine learning. An apparatus, in further embodiments, includes a grouping module configured to select a logical grouping of one or more machine learning pipelines to analyze a received objective. A logical grouping of one or more machine learning pipelines may include a training pipeline configured to generate a machine learning model for analyzing a received objective. A machine learning model may be trained using training data associated with a received objective. A logical grouping of one or more machine learning pipelines may include one or more inference pipelines configured to analyze the received objective using a machine learning model. One or more inference pipelines may be selected from a plurality of available inference pipelines that are each interconnected. A logical grouping of one or more machine learning pipelines may include a policy pipeline configured to push a generated machine model to one or more inference pipelines. An apparatus, in certain embodiments, includes an adjustment module configured to dynamically adjust one or more machine learning settings for the logical grouping of one or more machine learning pipelines based on feedback generated in response to analyzing the received objective.

A system, in one embodiment, includes a training node, a policy node, and one or more inference nodes. In one embodiment, a system includes an objective module configured to receive an objective to be analyzed using machine learning. A system, in further embodiments, includes a grouping module configured to select a logical grouping of one or more machine learning pipelines to analyze a received objective. A logical grouping of one or more machine learning pipelines may include a training pipeline configured to generate a machine learning model at a training node for analyzing a received objective. A machine learning model may be trained using training data associated with a received objective. A logical grouping of one or more machine learning pipelines may include one or more inference pipelines configured to analyze the received objective at one or more inference nodes using a machine learning model. One or more inference pipelines may be selected from a plurality of available inference pipelines that are each interconnected. A logical grouping of one or more machine learning pipelines may include a policy pipeline configured to push a generated machine model from a policy node to one or more inference pipelines. A system, in certain embodiments, includes an adjustment module configured to dynamically adjust one or more machine learning settings for the logical grouping of one or more machine learning pipelines based on feedback generated in response to analyzing the received objective.

A method, in one embodiment, includes receiving an objective to be analyzed using machine learning. A method, in further embodiments, includes selecting a logical grouping of one or more machine learning pipelines to analyze a received objective. A logical grouping of one or more machine learning pipelines may include a training pipeline configured to generate a machine learning model for analyzing a received objective. A machine learning model may be trained using training data associated with a received objective. A logical grouping of one or more machine learning pipelines may include one or more inference pipelines configured to analyze the received objective using a machine learning model. One or more inference pipelines may be selected from a plurality of available inference pipelines that are each interconnected. A logical grouping of one or more machine learning pipelines may include a policy pipeline configured to push a generated machine model to one or more inference pipelines. A method, in certain embodiments, includes dynamically adjusting one or more machine learning settings for the logical grouping of one or more machine learning pipelines based on feedback generated in response to analyzing the received objective.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
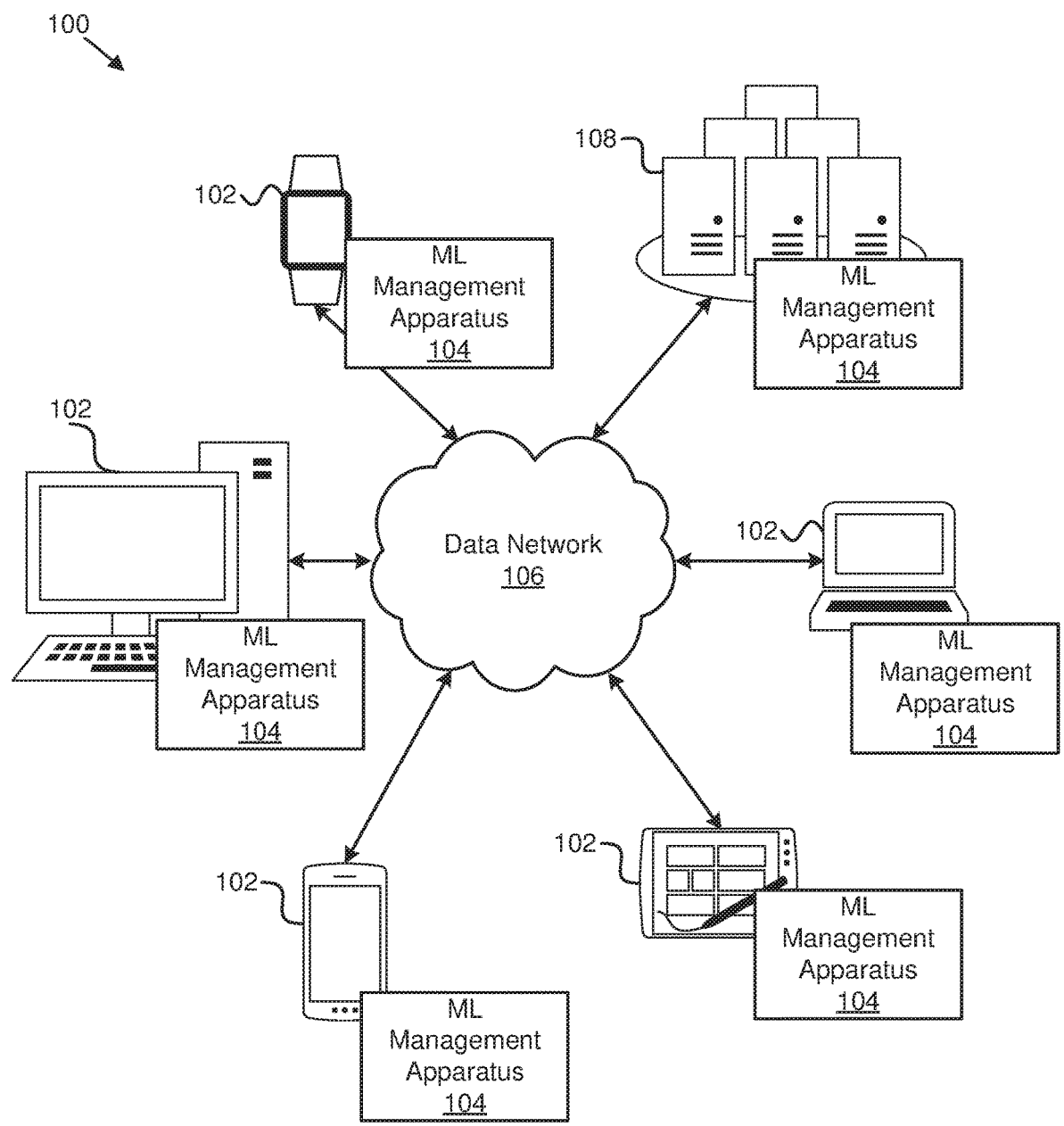
FIG. 1 is a schematic block diagram illustrating one embodiment of a system for machine learning abstraction.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for machine learning abstraction. In one embodiment, the system 100 includes one or more information handling devices 102, one or more ML management apparatuses 104, one or more data networks 106, and one or more servers 108. In certain embodiments, even though a specific number of information handling devices 102, ML management apparatuses 104, data networks 106, and servers 108 are depicted in FIG. 1, one of skill in the art will recognize, in light of this disclosure, that any number of information handling devices 102, ML management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for performing various machine learning operations, as described in more detail below.

In one embodiment, the ML management apparatus 104 is configured to design, manage, and dynamically adjust a machine learning overlay network, system, and/or the like for achieving a determined objected using machine learning. As will be explained in more detail below, a machine learning system involves various different components, pipelines, data sets, and/or the like—such as training pipelines, orchestration/management pipelines, inference pipelines, and/or the like. Furthermore, components may be specially designed or configured to handle specific objective, problems, and/or the like. In conventional machine learning systems, a user may be required to determine which machine learning components are necessary to analyze a particular problem/objective, and then manually determine the inputs/outputs for each of the components, the limitations of each component, events generated by each component, and/or the like. Furthermore, with conventional machine learning systems, it may be difficult to track down where an error occurred, what caused an error, why the predicted results weren't as accurate as they should be, and/or the like, due to the numerous components and interactions within the system.

In one embodiment, the ML management apparatus 104 improves upon conventional machine learning systems by determining a logical grouping of machine learning components of a machine learning system for analyzing a particular objective, receiving feedback from the machine learning components during and/or after the analysis, and dynamically adjusting machine learning features or settings within the system based on the feedback. For instance, if the results from a machine learning analysis are not as accurate as they should have been as compared to actual results, the ML management apparatus 104 may adjust the machine learning system by retraining machine learning models, by gathering more data, by using different machine learning algorithms, and/or the like. Furthermore, the ML management apparatus may provide feedback to a user such as suggestions, recommendations, and/or the like to make the machine learning system as optimal as possible. The ML management apparatus 104, including its various sub-modules, may be located on one or more information handling devices 102 in the system 100, one or more servers 108, one or more network devices, and/or the like. The ML management apparatus 104 is described in more detail below with reference to FIGS. 3 and 4.

In various embodiments, the ML management apparatus 104 may be embodied as a hardware appliance that can be installed or deployed on an information handling device 102, on a server 108, or elsewhere on the data network 106. In certain embodiments, the ML management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the ML management apparatus 104 may include a power interface, a wired and/or wireless network interface, a graphical interface that attaches to a display, and/or a semiconductor integrated circuit device as described below, configured to perform the functions described herein with regard to the ML management apparatus 104.

The ML management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the ML management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the ML management apparatus 104.

The semiconductor integrated circuit device or other hardware appliance of the ML management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the ML management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as machine learning data, algorithms, training models, and/or the like.

Figure 2A:
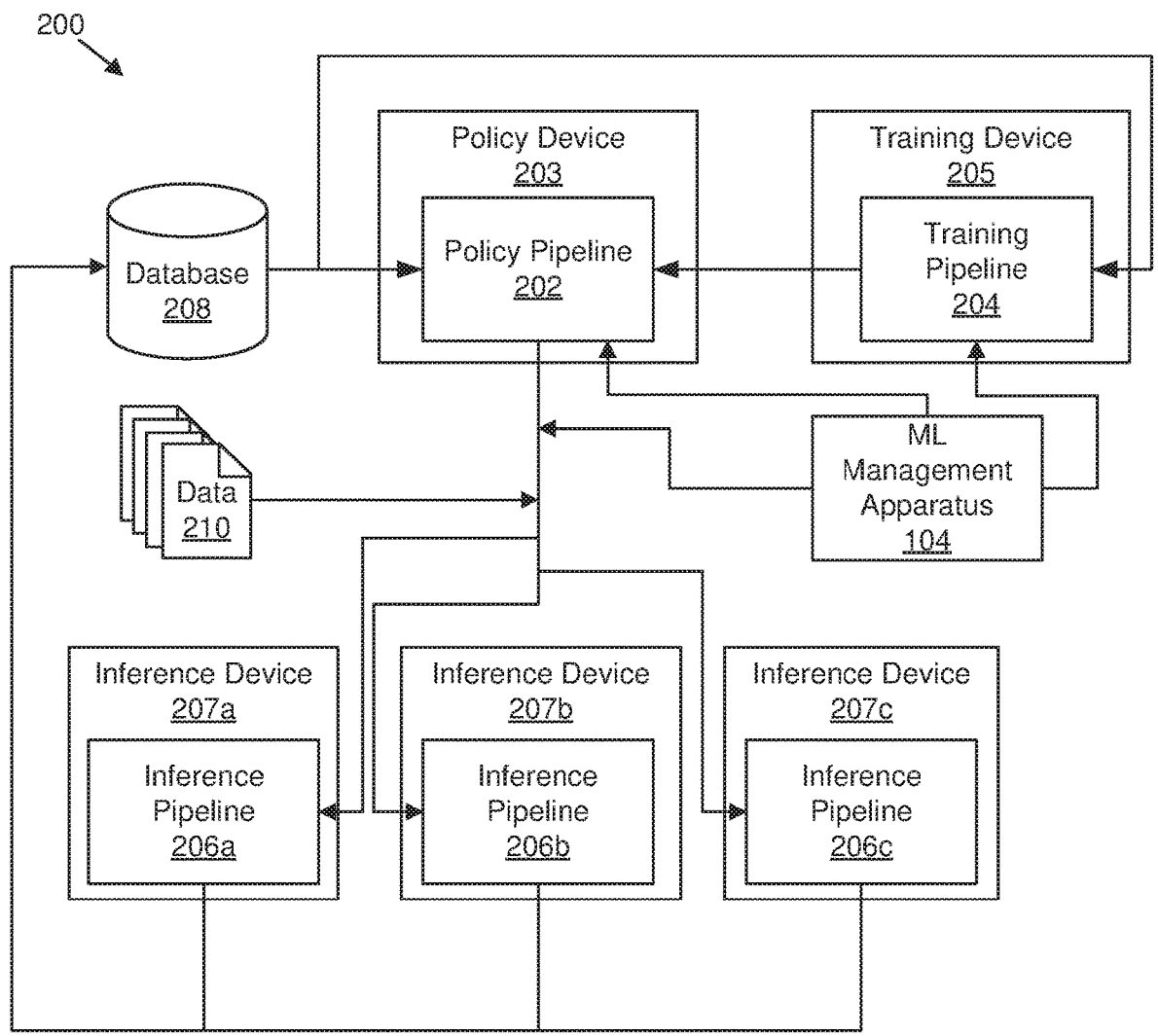
FIG. 2A is a schematic block diagram illustrating one embodiment of a logical machine learning layer for machine learning abstraction.

FIG. 2A is a schematic block diagram illustrating one embodiment of a logical machine learning layer 200 for machine learning abstraction. In one embodiment, the logical machine learning layer 200 includes one or more policy/control pipelines 202, one or more training pipelines 204, one or more inference pipelines 206a-c, one or more databases 208, input data 210, and an ML management apparatus 104. Even though a specific number of machine learning pipelines 202, 204, 206a-c are depicted in FIG. 2A, one of skill in the art, in light of this disclosure, will recognize that any number of machine learning pipelines 202, 204, 206a-c may be present in the logical machine learning layer 200. Furthermore, as depicted in FIG. 2A, the various pipelines 202, 204, 206a-c may be located on different nodes embodied as devices 203, 205, 207a-c such as information handling devices 102 described above, virtual machines, cloud or other remote devices, and/or the like. In some embodiments, the logical machine learning layer 200 is also known as an intelligence overlay network ("ION").

As used herein, machine learning pipelines 202, 204, 206a-c comprise various machine learning features, components, objects, modules, and/or the like to perform various machine learning operations such as algorithm training/inference, feature engineering, validations, scoring, and/or the like. Pipelines 202, 204, 206a-c may analyze or process data 210 in batch, e.g., process all the data at once from a static source, streaming, e.g., operate incrementally on live data, or a combination of the foregoing, e.g., a micro-batch.

In certain embodiments, each pipeline 202, 204, 206a-c executes on a device 203, 205, 207a-c, e.g., an information handling device 102, a virtual machine, and/or the like. In some embodiments, multiple different pipelines 202, 204, 206a-c execute on the same device. In various embodiments, each pipeline 202, 204, 206a-c executes on a distinct or separate device. The devices 203, 205, 207a-c may all be located at a single location, may be connected to the same network, may be located in the cloud or another remote location, and/or some combination of the foregoing.

In one embodiment, each pipeline 202, 204, 206a-c is associated with an analytic engine and executes on a specific analytic engine type for which the pipeline is 202, 204, 206a-c configured. As used herein, an analytic engine comprises the instructions, code, functions, libraries, and/or the like for performing machine learning numeric computation and analysis. Examples of analytic engines may include Spark, Flink, TensorFlow, Caffe, Theano, and PyTorch. Pipelines 202, 204, 206a-c developed for these engines may contain components provided in modules/libraries for the particular analytic engine (e.g., Spark-ML/MLlib for Spark, Flink-ML for Flink, and/or the like). Custom programs may also be included that are developed for each analytic engine using the application programming interface for the analytic engine (e.g., DataSet/DataStream for Flink). Furthermore, each pipeline may be implemented using various different platforms, libraries, programming languages, and/or the like. For instance, an inference pipeline 206a may be implemented using Python, while a different inference pipeline 206b is implemented using Java.

In one embodiment, the ML management apparatus 104 logically groups the machine learning pipelines 202, 204, 206a-c based on a desired objective, result, problem, and/or the like. For instance, the ML management apparatus 104 may select a training pipeline 204 for generating a machine learning model configured for the desired objective and one or more inference pipelines 206a-c that are configured to analyze the desired objective by processing input data 210 associated with the desired objective using the analytic engines for which the selected inference pipelines 206a-c are configured for and the machine learning model. Thus, groups may comprise multiple analytic engines, and analytic engines may be part of multiple groups. Groups can be defined to perform different tasks such as analyzing data for an objective, managing the operation of other groups, monitoring the results/performance of other groups, experimenting with different machine learning algorithms/models in a controlled environment, e.g., sandboxing, and/or the like.

For example, a logical grouping of machine learning pipelines 202, 204, 206a-c may be constructed to analyze the results, performance, operation, health, and/or the like of a different logical grouping of machine learning pipelines 202, 204, 206a-c by processing feedback, results, messages, and/or the like from the monitored logical grouping of machine learning pipelines 202, 204, 206a-c and/or by providing inputs into the monitored logical grouping of machine learning pipelines 202, 204, 206a-c to detect anomalies, errors, and/or the like.

Because the machine learning pipelines 202, 204, 206a-c may be located on different devices 203, 205, 207a-c, the same devices 203, 205, 207a-c, and/or the like, the ML management apparatus 104 logically groups machine learning pipelines 202, 204, 206a-c that are best configured for analyzing the objective. As described in more detail below, the logical grouping may be predefined such that a logical group of machine learning pipelines 202, 204, 206a-c may be particularly configured for a specific objective.

In certain embodiments, the ML management apparatus 104 dynamically selects machine learning pipelines 202, 204, 206a-c for an objecting when the objective is determined, received, and/or the like based on the characteristics, settings, and/or the like of the machine learning pipelines 202, 204, 206a-c. In certain embodiments, the multiple different logical groupings of pipelines 202, 204, 206a-c may share the same physical infrastructure, platforms, devices, virtual machines, and/or the like. Furthermore, the different logical groupings of pipelines 202, 204, 206a-c may be merged, combined, and/or the like based on the objective being analyzed. The logical grouping of machine learning pipelines 202, 204, 206a-c will be discussed in more detail below.

In one embodiment, the policy pipeline 202 is configured to maintain/manage the operations within the logical machine learning layer 200. In certain embodiments, for instance, the policy pipeline 202 receives machine learning models from the training pipeline 204 and pushes the machine learning models to the inference pipelines 206a-c for use in analyzing the input data 210 for the objective. In various embodiments, the policy pipeline 202 receives user input associated with the logical machine learning layer 200, receives event and/or feedback information from the other pipelines 204, 206a-c, validates machine learning models, facilitates data transmissions between the pipelines 202, 204, 206a-c, and/or the like.

In one embodiment, the policy pipeline 202 comprises one or more policies that define how pipelines 204, 206a-c interact with one another. For example, the training pipeline 204 may output a machine learning model after a training cycle has completed. Several possible policies may define how the machine learning model is handled. For example, a policy may specify that the machine learning model can be automatically pushed to inference pipelines 206a-c while another policy may specify that user input is required to approve a machine learning model prior to the policy pipeline 202 pushing the machine learning model to the inference pipelines 206a-c. Policies may further define how machine learning models are updated.

For instance, a policy may specify that a machine learning model be updated automatically based on feedback, e.g., based machine learning results received from an inference pipeline 206a-c; a policy may specify whether a user is required to review, verify, and/or validate a machine learning model before it is propagated to inference pipelines 206a-c; a policy may specify scheduling information within the logical machine learning layer 200 such as how often a machine learning model is update (e.g., once a day, once an hour, continuously, and/or the like); and/or the like.

Policies may define how different logical groups of pipelines 202, 204, 206a-c interact or cooperate to for a cohesive data intelligence workflow. For instance, a policy may specify that the results generated by one logical machine learning layer 200 be used as input into a different logical machine learning layer 200, e.g., as training data for a machine learning model, as input data 210 to an inference pipeline 206a-c, and/or the like. Policies may define how and when machine learning models are updated, how individual pipelines 202, 204, 206a-c communicate and interact, and/or the like.

In one embodiment, the policy pipeline 202 maintains a mapping of the pipelines 204, 206a-c that comprise the logical grouping of pipelines 204, 206a-c. The policy pipeline may further adjust various settings or features of the pipelines 204, 206a-c in response to user input, feedback or events generated by the pipelines 204, 206a-c, and/or the like. For example, if an inference pipeline 206a generates machine learning results that are inaccurate, the policy pipeline 202 may receive a message from the inference pipeline 202 that indicates the results are inaccurate, and may direct the training pipeline 204 to generate a new machine learning model for the inference pipeline 206a.

The training pipeline 204, in one embodiment, is configured to generate a machine learning model for the objective that is being analyzed based on historical or training data that is associated with the objective. As used herein, a machine learning model is generated by executing a training or learning algorithm on historical or training data associated with a particular objective. The machine learning model is the artifact that is generated by the training process, which captures patterns within the training data that map the input data to the target, e.g., the desired result/prediction. In one embodiment, the training data may be a static data set, data accessible from an online source, a streaming data set, and/or the like.

The inference pipelines 206a-c, in one embodiment, use the generated machine learning model and the corresponding analytics engine to generate machine learning results/predictions on input data 210 that is associated with the objective. The input data may comprise data associated with the objective that is being analyzed, but was not part of the training data, e.g., the patterns/outcomes of the input data are not known. For example, if a user wants to know whether an email is spam, the training pipeline 204 may generate a machine learning model using a training data set that includes emails that are known to be both spam and not spam. After the machine learning model is generated, the policy pipeline 202 pushes the machine learning model to the inference pipelines 206a-c, where it is used to predict whether one or more emails, e.g., provided as input data 210, are spam.

Thus, as depicted in FIG. 2A, a policy pipeline 202, a training pipeline 204 and inference pipelines 206a-c are depicted in an edge/center graph. In the depicted embodiment, new machine learning models are periodically retrained in a batch training pipeline 204, which may execute on a large clustered analytic engine in a data center. As the training pipeline 204 generates new machine learning models, an administrator may be notified. The administrator may review the generated machine learning models, and if the administrator approves, the machine learning models are pushed to the inference pipelines 206a-c that comprise the logical pipeline grouping for the objective, each of which is executing on live data coming from an edge device, e.g., input data 210.

Figure 2B:
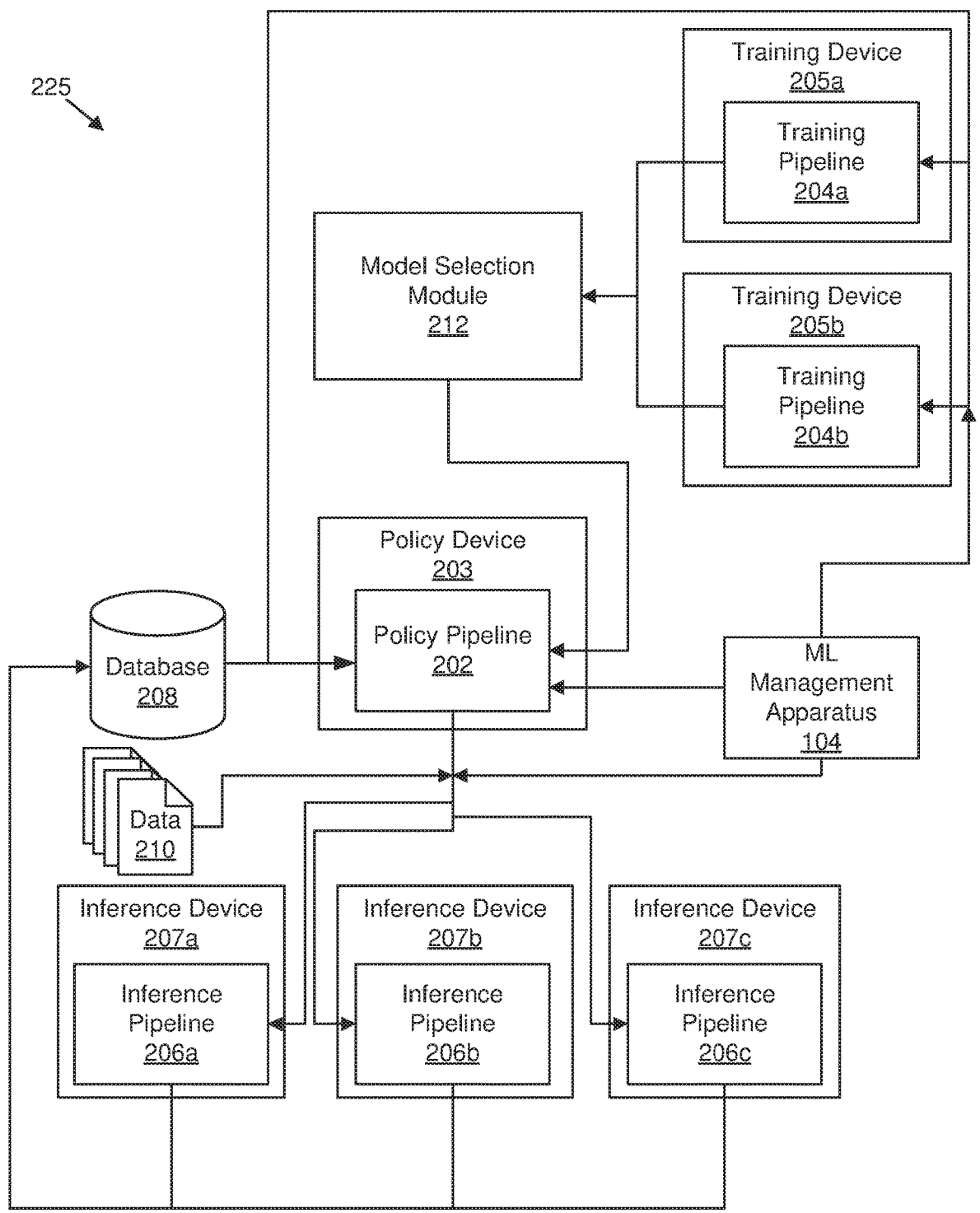
FIG. 2B is a schematic block diagram illustrating another embodiment of a logical machine learning layer for machine learning abstraction.

FIG. 2B is a schematic block diagram illustrating another embodiment of a logical machine learning layer 225 for machine learning abstraction. In one embodiment, the logical machine learning layer 225 of FIG. 2B is substantially similar to the logical machine learning layer 200 depicted in FIG. 2A. In addition to the elements of the logical machine learning layer 200 depicted in FIG. 2A, the logical machine learning layer 225 of FIG. 2B includes a plurality of training pipelines 204a-b, executing on training devices 205a-b.

In the depicted embodiment, the training pipelines 204a-b generate machine learning models for an objective, based on training data for the objective. The training data may be different for each of the training pipelines 204a-b. For instance, the training data for a first training pipeline 204a may include historical data for a predefined time period while the training data for a second training pipeline 204b may include historical data for a different predefined time period. Variations in training data may include different types of data, data collected at different time periods, different amounts of data, and/or the like.

In other embodiments, the training pipelines 204a-b may execute different training or learning algorithms on different or the same sets of training data. For instance, the first training pipeline 204a may implement a training algorithm TensorFlow using Python, while the second training pipeline 204b implements a different training algorithm in Spark using Java, and/or the like.

In one embodiment, the logical machine learning layer 225 includes a model selection module 212 that is configured to receive the machine learning models that the training pipelines 204a-b generate and determine which of the machine learning models is the best fit for the objective that is being analyzed. The best-fitting machine learning model may be the machine learning model that produced results most similar to the actual results for the training data (e.g., the most accurate machine learning model), the machine learning model that executes the fastest, the machine learning model that requires the least amount of configuration, and/or the like.

In one embodiment, the model selection module 212 performs a hyper-parameter search to determine which of the generated machine learning models is the best fit for the given objective. As used herein, a hyper-parameter search, optimization, or tuning is the problem of choosing a set of optimal hyper-parameters for a learning algorithm. In certain embodiments, the same kind of machine learning model can require different constraints, weights, or learning rates to generalize different data patterns. These measures are called hyper-parameters, and have to be tuned so that the model can optimally solve the machine learning problem. Hyper-parameter optimization finds a set of hyper-parameters that yields an optimal machine learning model that minimizes a predefined loss function on given independent data. In certain embodiments, the model selection module 212 combines different features of the different machine learning models to generate a single combined model. In one embodiment, the model selection module 212 pushes the selected machine learning model to the policy pipeline 202 for propagation to the inference pipelines 206a-c. In various embodiments, the model selection module 212 is part of, communicatively coupled to, operatively coupled to, and/or the like the ML management apparatus 104.

Figure 2C:
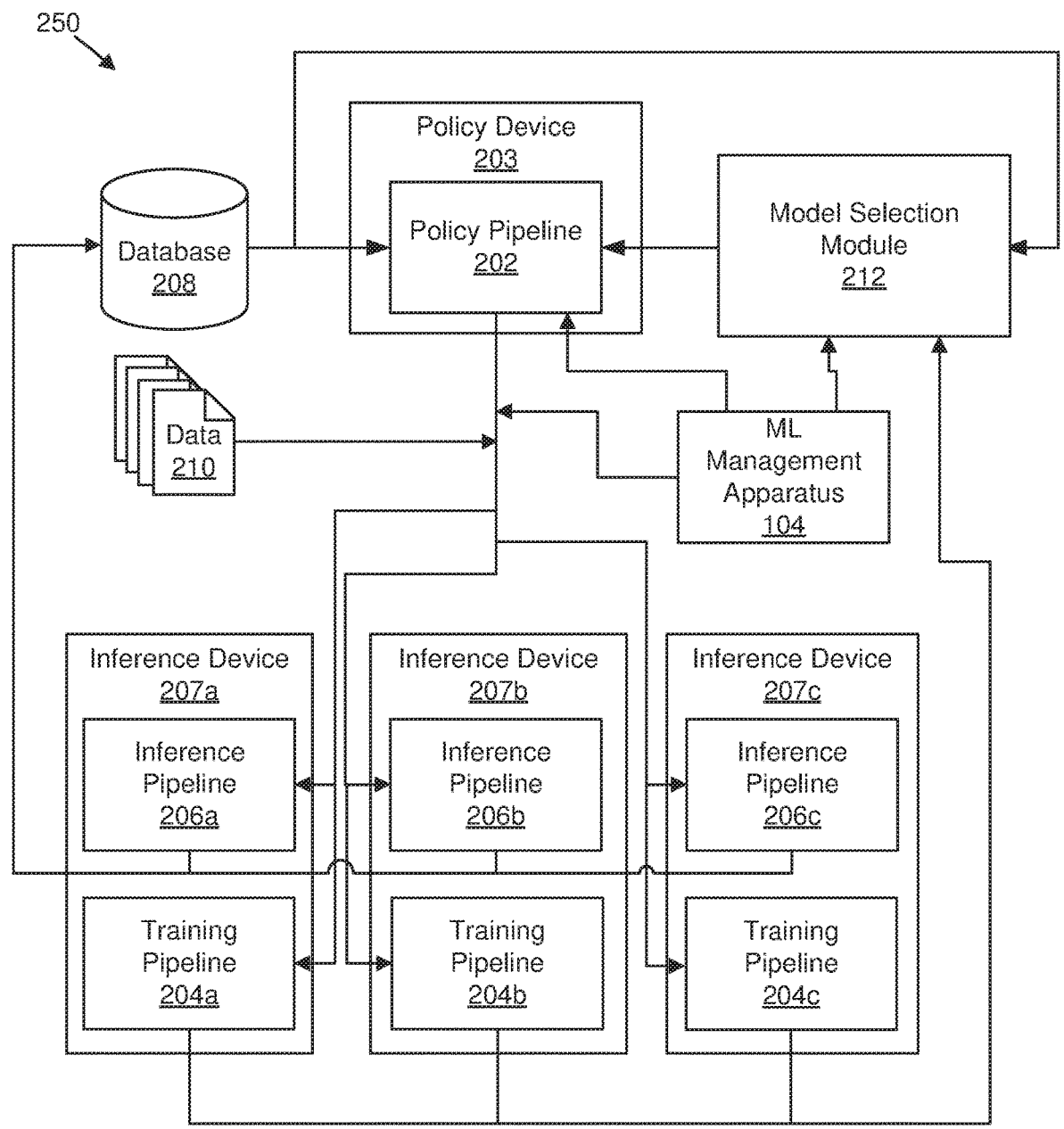
FIG. 2C is a schematic block diagram illustrating a certain embodiment of a logical machine learning layer for machine learning abstraction.

FIG. 2C is a schematic block diagram illustrating a certain embodiment of a logical machine learning layer 250 for machine learning abstraction. In one embodiment, the logical machine learning layer 250 of FIG. 2C is substantially similar to the logical machine learning layers 200, 225 depicted in FIGS. 2A and 2B, respectively. In further embodiments, FIG. 2C illustrates a federated learning embodiment of the logical machine learning layer 250.

In a federated machine learning system, in one embodiment, the training pipelines 204a-c are located on the same physical or virtual devices as the corresponding inference pipelines 206a-c. In such an embodiment, the training pipelines 204a-c generate different machine learning models and send the machine learning models to the model selection module 212, which determines which machine learning model is the best fist for the logical machine learning layer 250, as described above, or combines/merges the different machine learning models, and/or the like. The selected machine learning model is pushed to the policy pipeline 202, for validation, verification, or the like, which then pushes it back to the inference pipelines 206a-c.

Figure 3:
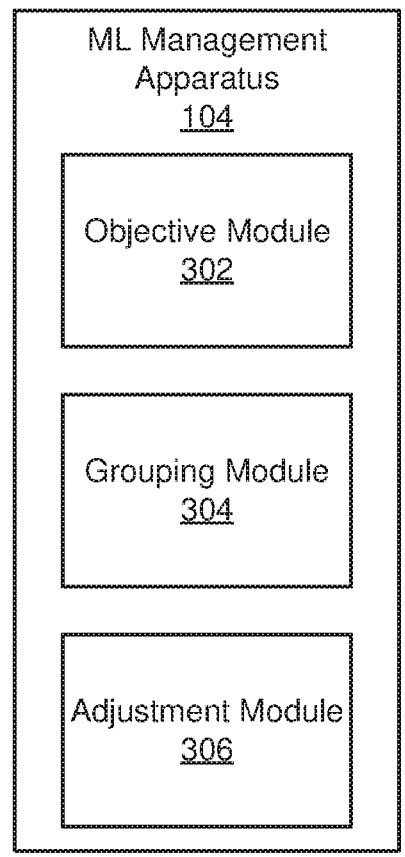
FIG. 3 is a schematic block diagram illustrating one embodiment of an apparatus for machine learning abstraction.

FIG. 3 is a schematic block diagram illustrating one embodiment of an apparatus 300 for machine learning abstraction. In one embodiment, the apparatus 300 includes an embodiment of an ML management apparatus 104. The ML management apparatus 104, in one embodiment, includes one or more of an objective module 302, a grouping module 304, and an adjustment module 306, which are described in more detail below.

In one embodiment, the objective module 302 is configured to receive an objective to be analyzed using machine learning, and in particular, using one or more of the logical machine learning layers 200, 225, 250 described above. The objective may be to determine predictions, forecast results, and/or the like associated with a particular problem. Example objectives may include forecasting hurricane trajectories, predicting sales for an item given various demographic data, and/or the like. In certain embodiment, the objective module 302 receives the objective from a user. For instance, a user may use a graphical interface to specify an objective, upload or otherwise provide training data and inference data for analyzing the objective, and/or the like. In addition, the user may specify which machine learning models should be used to analyze the problem, which inference pipelines 206a-c should be used, which policies should be applied, and/or the like.

In one embodiment, the grouping module 304 is configured to select a logical grouping of one or more machine learning pipelines 202, 204, 206a-c, that can be used to analyze the objective. The logical grouping may include one or more training pipelines 204 for training machine learning models, one or more inference pipelines 206a-c for processing new input data 210 using the trained machine learning models, and one or more policy pipelines 202 for managing, maintaining, orchestrating, and/or the like communications, data transmissions, and/or the like between the pipelines 202, 204, 206a-c.

The grouping module 304, in certain embodiments, selects the logical grouping of machine learning pipelines 202, 204, 206a-c according to predefined grouping for a particular objective. For instance, the policy pipeline 202 may maintain a policy, mapping, listing, table, and/or the like of objective that the grouping module 304 uses to determine which training and inference pipelines 204, 206a-c to include in the logical grouping. For example, if the objective is to predict how many red cars will be sold in May, the grouping module 304 may check if any of the pipelines 202, 204, 206a-c have been configured to analyze such a problem, or a substantially similar problem. If so, the grouping module 304 may select such a logical grouping and may trigger generating a new machine learning model for the particular objective, which may then be pushed to the inference pipelines 206a-c for analysis on new or live input data 210.

In further embodiments, the grouping module 304 may receive user input that specifies which pipelines 202, 204, 206a-c to include in the logical grouping for a particular objective. For example, a user may select particular training and/or inference pipelines 204, 206a-c for a particular objective based on the features of the pipelines (e.g., the analytics engines being used, the available machine learning models, and/or the like), the desired outcomes (e.g., predictions, forecasts, and/or the like), the hardware or virtual machines that the pipelines 202, 204, 206a-c are executing on, and/or the like.

Furthermore, the grouping module 304 may specify a particular policy of the policy pipeline 202 that specifies the parameters of the logical grouping of pipelines 202, 204, 206a-c. For instance, the policy may define parameters for the selected pipelines 204, 206a-c (e.g., weights, inputs, outputs, and/or the like), may specify particular machine learning models to use, may specify training data sets for training the machine learning model, may specify input data sets to analyze at the inference pipelines 206a-c, and/or the like.

In one embodiment, the adjustment module 306 is configured to dynamically adjust one or more machine learning settings for the logical grouping of one or more machine learning pipelines 202, 204, 206a-c based on feedback generated in response to analyzing the received objective. In certain embodiments, the machine learning pipelines 202, 204, 206a-c are configured to send messages to other machine learning pipelines 202, 204, 206a-c of the logical grouping of pipelines while the objective is being analyzed, e.g., while the machine learning model is being trained at the training pipeline 204, while the objective is being analyzed at the inference pipelines 206a-c, and/or the like.

In some embodiments, the messages may indicate whether a status of a machine learning pipeline 202, 204, 26a-c, an error in the training or analysis, a request for more data, a request for additional processing, information/recommendations/suggestions for adjusting different settings of the machine learning pipelines 202, 204, 206a-c, and/or the like. In certain embodiments, the messages are sent directly to different machine learning pipelines (e.g., an inference pipeline 206a may send a message directly to the machine learning pipeline 204 that includes recommendations or data for improving the accuracy of the machine learning model) or are sent to the policy pipeline 202 for processing and distribution to the other pipelines 204, 206a-c.

The messages, including corresponding information associated with the messages such as a timestamp, a dump file or other information that caused the message to be generated and sent, the current state of an inference pipeline 206a-c or training pipeline 204, and/or the like may be stored in a database 208 for later reference. For instance, if an inference pipeline 206a detects an error with a machine learning model while performing machine learning operations using a machine learning model, the error information may be stored in the database 208 so that it can be analyzed to determine what caused the error, the states of the pipelines 202, 204, 206a-c when the error was generated, and/or the like. In this manner, if there is an error during the analysis of the objective, the issue can be traced to which components, e.g., which machine learning pipelines 202, 204, 206a-c caused the error.

In an example embodiment, the results of a logical machine learning layer 200, 225, 250 may be correlated to key performance indexes ("KPIs") for a business objective that describes the actual end user's behaviors as it relates to the objective and the predicted or suggested results for the objective. For example, a business objective may include making recommendations to a user about what to purchase from an online store. In such an embodiment, the accuracy of the results of the logical machine learning layer 200, 225, 250 may refer to whether the recommendations for the user are what should have been recommended, and the KPIs for the objective refers to whether the user purchased what was recommended. Thus, even if the logical machine learning layer 200, 225, 250 recommended something unexpected, if the user purchased what was recommended, then it would be a success. Tracking what the user purchased would be the KPI.

Accordingly, because a logical machine learning layer 200, 225, 250 encapsulates all of the machine learning pipelines 202, 204, 206a-c for an objective, it enables direct correlation with the KPIs for the objective. In this manner, any changes within the logical machine learning layer 200, 225, 250 can be correlated with changes in KPIs. For instance, if there are more or less KPI successes, the corresponding logical machine learning layer 200, 225, 250 may be analyzed for events, messages, errors, alerts, unexpected changes, and/or the like, within a time proximity of the KPI changes, that indicate what caused the KPI changes.

The adjustment module 306 may update various settings, models, libraries, instructions, and/or the like of a pipeline 202, 204, 206a-c and may integrate, implement, or otherwise propagate the updates seamlessly within the logical machine learning layer 202, 204, 206a-c. In such an embodiment, there may not be any data loss because state information for a machine learning pipeline 202, 204, 206a-c and data read offsets, e.g., the read position of the input data 210, may be maintained from the point just prior to the update. In one embodiment, the adjustment module 306 may implement updates within a machine learning pipeline 202, 204, 206a-c regardless of the platform, analytic engine, device, or virtual machine that it executes on because an agent executing on each platform, as described below, may translate, convert, and/or the like machine learning parameters, e.g., a machine learning model, to the corresponding platform that it is executing on. For example, the adjustment module 306 may switch machine learning models in real-time or on the fly while a logical machine learning layer 200, 225, 250 is in production, and may ensure that no data is lost by check-pointing the states of the pipelines 202, 204, 206a-c prior to the update.

Figure 4:
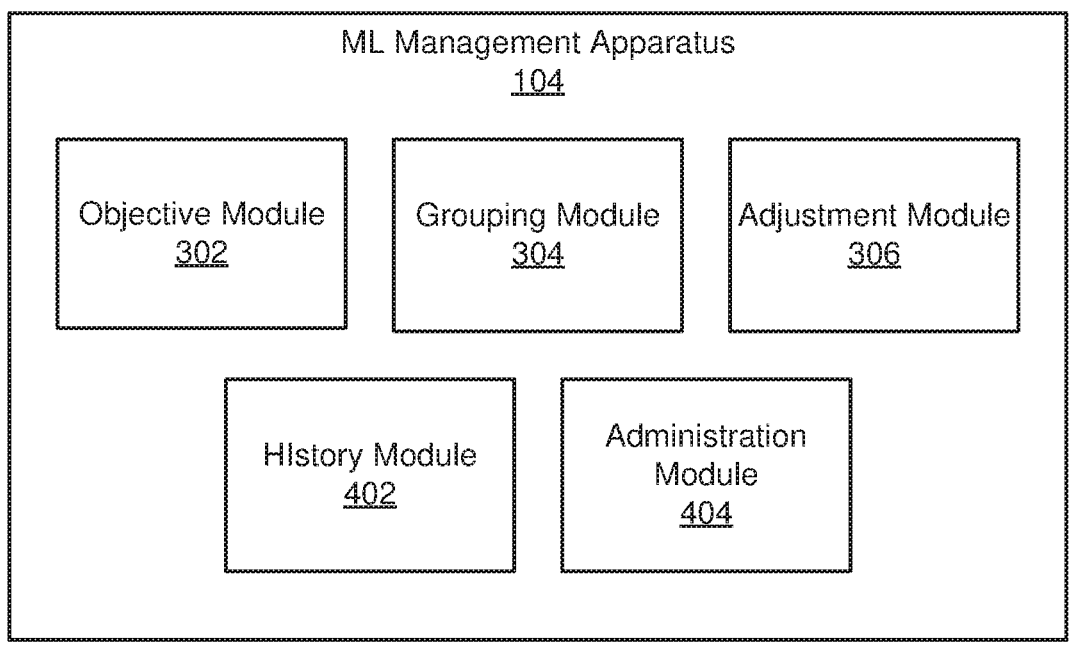
FIG. 4 is a schematic block diagram illustrating another embodiment of an apparatus for machine learning abstraction.

FIG. 4 is a schematic block diagram illustrating another embodiment of an apparatus 400 for machine learning abstraction. In one embodiment, the apparatus 400 includes an instance of an ML management apparatus 104. In certain embodiments, the ML management apparatus 104 includes one or more of an objective module 302, a grouping module 304, and an adjustment module 306, which may be substantially similar to the objective module 302, the grouping module 304, and the adjustment module 306 described above with reference to FIG. 3. In further embodiments, the ML management apparatus 104 includes one or more of a history module 402 and an administration module 404, which are described in more detail below.

The history module 402, in one embodiment, is configured to track a version history for each of the machine learning pipelines 202, 204, 206a-c such that changes to the machine learning pipelines can be rolled-back to a previous version. The version history may include the inputs to a pipeline 202, 204, 206a-c, outputs from a pipeline 202, 204, 206a-c, processing logs for a pipeline 202, 204, 206a-c, communications to and/or from a pipeline 202, 204, 206a-c, and/or the like. The version history may also include timestamps for various events that occurred during processing. For example, the version history may track when a machine learning model was generated, which data set was used to train the machine learning model, when the machine learning model was pushed to an inference pipeline 206a-c, the input data that the inference pipeline 206a-c uses to analyze the objective, the various weights or other characteristics of the machine learning model that were used to analyze the input data, dependencies, and interconnections for each of the machine learning pipelines 202, 2024, 206a-c, and/or the like.

In certain embodiments, the history module 402 tracks the lineage, e.g., the interdependencies between each machine learning pipeline 202, 204, 206a-c, including the data input into and output from the machine learning pipelines 202, 204, 206a-c, events that a machine learning pipeline 202, 204, 206a-c generates, messages sent to/from machine learning pipelines 202, 204, 206a-c, and/or user input provided to the machine learning pipelines 202, 204, 206-c. In this manner, the overall behavior or operation of a logical machine learning layer 200, 225, 250, can be determined. For example, if an inference pipeline 206a-c creates an unacceptable prediction, e.g., a prediction value that does not satisfy a threshold prediction, the issue may be tracked to the training pipeline 204 that generated the machine learning model that is being used, the data that the training pipeline 204 used to generate the machine learning model, the configuration parameters used for the machine learning model, the user who reviewed and verified that machine learning model, and so on. Furthermore, changes that are made to a part of the logical machine learning layer 200, 225, 250 may be tracked and correlated with effects in other parts of the machine learning layer 200, 225, 250, such as prediction behavior that the inference pipelines 206a-c express.

In one embodiment, the history module 402 tracks various characteristics of multiple different logical machine learning layers 200, 225, 250 (e.g., logical machine learning layers 200, 225, 250 that include different machine learning pipelines 202, 204, 206a-c, different analytic engines, different devices/virtual machines, different machine learning models, and/or the like) that are each configured to analyze the objective to determine which of the logical learning layers 200, 225, 250 is the best fit for analyzing the objective. The various characteristics may include determining which logical learning layer 200, 225, 250 consumes the least amount of resources, produces the most accurate results, executes in the least amount of time, performs the best in terms of latency, and/or the like.

In one embodiment, the history module 402 tracks when updates to different machine learning pipelines 202, 204, 206a-c are made, and may generate checkpoints, on a per-machine learning pipeline 202, 204, 206a-c or per-logical machine learning layer 200, 225, 250 basis, that allow machine learning pipelines 202, 204, 206a-c and/or logical machine learning layers 200, 225, 250 to be rolled-back to a previous state prior to the updates being implemented.

In one embodiment, the administration module 404 is configured to present an interface for monitoring, controlling, modifying, setting, configuring, and/or the like one or more parameters of the pipelines 202, 204, 206a-c of the logical machine learning layer 200, 225, 250. For instance, the graphical interface may allow a user to configure various settings of the training pipeline 204 such as selecting and/or modifying the training data that is used to train the machine learning model, setting the weights or other characteristics of the machine learning model, selecting a particular machine learning model for the inference pipeline 206a-c to use, binding machine learning pipelines 202, 204, 206a-c to analytics engines, and/or the like. Similarly, the administration module 404 may receive input from a user that specifies which pipelines 202, 204, 206a-c should be logically grouped for analyzing the objective, different policies that define how the logical machine learning layer 200, 225, 250 operates, and/or the like.

In certain embodiments, the administration module 404 is located on, communicatively coupled to, or otherwise integrated with the policy pipeline 202. The administration module 404, in such an embodiment, is configured to monitor events, messages, communications, data transfers, and/or the like from, to, between, or the like the machine learning pipelines 202, 204, 206a-c. In one embodiment, the administration module 404 is communicatively coupled to one or more agents that are located on the devices/machines that the machine learning pipelines 202, 204, 206a-c execute on. The agents may comprise hardware components, software components, and/or a combination of hardware and software that is configured for monitoring events, statuses, messages, errors, anomalies, and/or the like that occur in association with a machine learning pipeline 202, 204, 206a-c, and communicate information about the machine learning pipeline 202, 204, 206a-c to the administration module 404.

An agent may be configured to perform various operations in relation to an analytic engine. For instance, an agent may be configured to manage local communications with an analytic engine, translate between an analytic engine's protocols and other formats (e.g., other API formats), manage communications between the analytic engine and other components with a logical machine learning layer 200, 225, 250, perform operations that are more efficiently executed at the analytic engine (e.g., data computations requiring large amounts of data in order to avoid large data transfers between the analytic engine and other components), support heterogeneity within a logical machine learning layer 200, 225, 250 (e.g., unique engine aspects managed by an agent, where there is one agent type for each engine type, to support different types of analytic engines), handle intermittent connectivity issues and/or engine errors/failures, and/or the like.

In such an embodiment, the administration module 404 processes the information that is received from the agents. For instance, the administration module 404 may present the information on a graphical display (e.g., for a user to view), may cause/trigger the policy pipeline 202 to make adjustments within the logical machine learning layer 200, 225, 250, and/or the like. For instance, if the agent detects an error with an inference pipeline 206a, such as a processing error, hardware failure, and/or the like, the administration module 404 may receive the error information and direct the policy pipeline 202 to remove the inference pipeline 206a from the logical machine learning layer 200, 225, 250, and/or select a different inference pipeline 206a to include in the logical machine learning layer 200, 225, 250.

In some embodiments, the administration module 404 receives execution information that the agents monitor for each device/machine that the machine learning pipelines 202, 204, 206a-c execute on. For instance, the administration module 404 may receive CPU utilization information, memory utilization information, network utilization information, and/or the like, and may present the information on a graphical display, may make adjustments to the machine learning pipelines 202, 204, 206a-c based on the information, and/or the like. In some embodiments, the administration module 404 adjusts the execution of machine learning pipelines 202, 204, 206a-c based on the execution information. For instance, the administration module 404 may adjust, via an agent, the processor priority of an inference pipeline 206a in response to determining that the pipeline is using too much or too little processing power of the device 207a that it is executing on. Other adjustments may be made to correspond to a pipelines 202, 204, 206a-c memory usage, network bandwidth usage, and/or the like.

Figure 5:
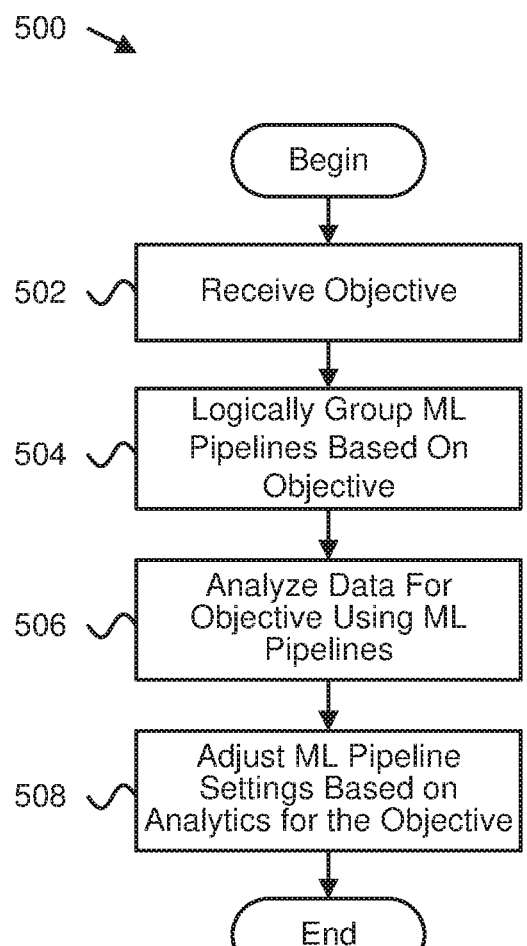
FIG. 5 is a schematic flow chart diagram illustrating one embodiment of a method for machine learning abstraction.

FIG. 5 is a schematic flow chart diagram illustrating one embodiment of a method 500 for machine learning abstraction. In one embodiment, the method 500 begins, and the objective module 302 receives 502 an objective to be analyzed using machine learning. In further embodiments, the grouping module 304 selects 504 a logical grouping of one or more machine learning pipelines 202, 204, 206a-c for analyzing the received objective, and analyzes 506 the objective using the one or more machine learning pipelines 202, 204, 206a-c. In various embodiments, the adjustment module 306 dynamically adjusts 508 one or more machine learning settings for the logical grouping of one or more machine learning pipelines 202, 204, 206a-c based on events generated in response to analyzing the received objective, and the method 500 ends.

Figure 6:
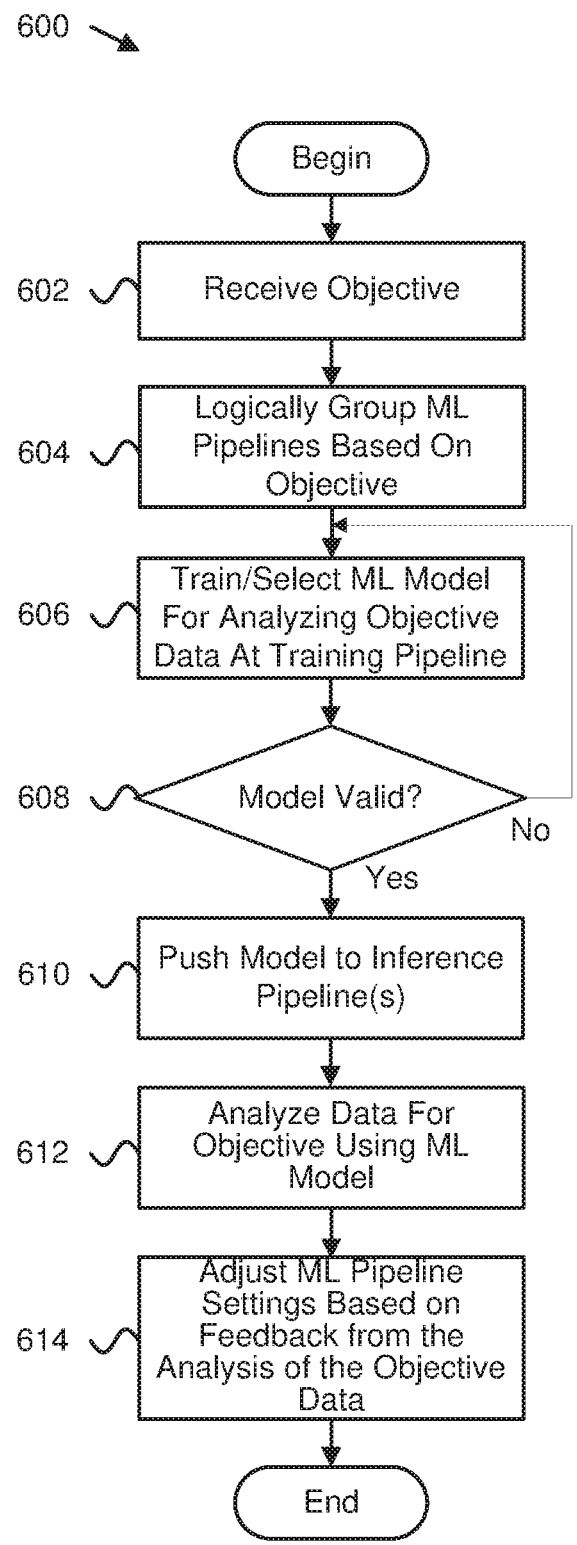
FIG. 6 is a schematic flow chart diagram illustrating another embodiment of a method for machine learning abstraction.

FIG. 6 is a schematic flow chart diagram illustrating another embodiment of a method 600 for machine learning abstraction. In one embodiment, the method 600 begins, and the objective module 302 receives 602 an objective to be analyzed using machine learning. In further embodiments, the grouping module 304 selects 604 a logical grouping of one or more machine learning pipelines 202, 204, 206a-c for analyzing the received objective, and analyzes 506 the objective using the one or more machine learning pipelines 202, 204, 206a-c.

In one embodiment, a training pipeline 204 trains 606 one or more machine learning models for analyzing the objective at one or more inference pipelines 206a-c. In further embodiments, a policy pipeline 202 determines 608 whether the machine learning model is valid, and if not, the method 600 returns to training 606 one or more machine learning model at the training pipeline 204. Otherwise, the policy pipeline 202 pushes 610 the machine learning model to the inference pipelines 206a-c. The inference pipelines 206a-c, in one embodiment, use 612 the machine learning model to analyze input data 210 for the objective to generate predictions, forecasts, suggestions, recommendations, and/or the like. In further embodiments, the adjustment module 306 dynamically adjusts 614 one or more machine learning settings for the logical grouping of one or more machine learning pipelines 202, 204, 206a-c based on events generated in response to analyzing the received objective, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, by at least one processor from a user computing device, an objective to be analyzed using a model trained with machine learning;
identifying, by the at least one processor, a grouping of pipelines for analyzing the objective, the grouping of pipelines comprising:
a training pipeline comprising first code configured to train, using a training dataset associated with the objective, the model to receive an input from the user computing device and analyze the input in accordance with the training pipeline;
one or more inference pipelines comprising second code configured to generate, via the model, an outcome corresponding to the input received from the user computing device; and
a policy pipeline comprising third code configured to push the model to the one or more inference pipelines;
selecting, by the at least one processor responsive to the objective, the one or more inference pipelines from the grouping of pipelines for analyzing the objective, wherein the one or more inference pipelines is configured to send, during execution, a message to at least one of the training pipeline or the policy pipeline indicative of an error;
adjusting, by the at least one processor, a setting of the model based on the message sent by the one or more inference pipelines selected to analyze the objective; and
presenting, by the at least one processor, for display on the user computing device, an indication of at least one parameter of at least one pipeline of the one or more inference pipelines.

2. The method of claim 1, further comprising:
training, by the at least one processor, the model using the grouping of pipelines.

3. The method of claim 1, further comprising:
monitoring, by the at least one processor, a behavior of a user associated with the user computing device with respect the objective generated via the model using the grouping of pipelines;
re-adjusting, by the at least one processor, the setting for the grouping of pipelines based on the behavior.

4. The method of claim 1, wherein the policy pipeline is configured to determine whether the model satisfies a fitness criterion.

5. The method of claim 4, wherein the fitness criterion corresponds to at least one of speed, accuracy, or amount of configuration associated with the model.

6. The method of claim 1, further comprising:
receiving, by the at least one processor from the user computing device, a second input corresponding to a revision to the grouping of pipelines; and
adjusting, by the at least one processor, at least one pipeline in accordance with the second input.

7. The method of claim 1, wherein selecting, by the at least one processor, the one or more inference pipelines is in accordance with a pre-determined table of selections and corresponding objectives, whereby the at least one processor selects the one or more inference pipelines when the one or more inference pipelines corresponds to a second objective that is similar to the objective received from the user computing device.

8. The method of claim 1, wherein the training pipeline, the one or more inference pipelines, and the policy pipeline execute on distinct one or more of physical computing devices and virtual machines.

9. The method of claim 1, wherein adjusting the setting is based on one or more of events, predictions, new models, the input, errors, and user-defined events.

10. The method of claim 1, further comprising:
executing, by the at least one processor, the model using the input received from the user computing device; and
receiving, by the at least one processor from the model, a predicted outcome associated with the objective.

11. A system comprising:
one or more processors in communication with a model trained with machine learning, the one or more processors configured to:
  receive, from a user computing device, an objective to be analyzed using the model;
  identify a grouping of pipelines for analyzing the objective, the grouping of pipelines comprising:
    a training pipeline comprising first code configured to train the model using a training dataset associated with the objective, the model receive an input from the user computing device and analyze the input in accordance with the training pipeline;
    one or more inference pipelines comprising second code configured to generate, via the model, an outcome corresponding to the input received from the user computing device; and
    a policy pipeline comprising third code configured to push the model to the one or more inference pipelines;
  select, responsive to the objective, the one or more inference pipelines from the grouping of pipelines for analyzing the objective, wherein the one or more inference pipelines is configured to send, during execution, a message to at least one of the training pipeline or the policy pipeline indicative of an error;
  adjust a setting of the model based on the message sent by the one or more inference pipelines selected to analyze the objective; and
  present for display on the user computing device, an indication of at least one parameter of at least one pipeline of the one or more inference pipelines.

12. The system of claim 11, wherein the one or more processors are further configured to:
  train the model using the grouping of pipelines.

13. The system of claim 11, wherein the one or more processors are further configured to:
  monitor a behavior of a user associated with the user computing device with respect the objective generated via the model using the grouping of pipelines;
  re-adjust the setting for the grouping of pipelines based on the behavior.

14. The system of claim 11, wherein the policy pipeline in configured to determine whether the model satisfies a fitness criterion.

15. The system of claim 14, wherein the fitness criterion corresponds to at least one of speed, accuracy, or amount of configuration associated with the model.

16. The system of claim 11, wherein the one or more processors are further configured to:
  receive, from the user computing device, a second input corresponding to a revision to the grouping of pipelines; and
  adjust at least one pipeline in accordance with the second input.

17. The system of claim 11, wherein the selection of the one or more inference pipelines is in accordance with a pre-determined table of selections and corresponding objectives, whereby the one or more processors are further configured to select the one or more inference pipelines when the grouping corresponds to a second objective that is similar to the objective received from the user computing device.

18. The system of claim 11, wherein the training pipeline, the one or more inference pipelines, and the policy pipeline execute on distinct one or more of physical computing devices and virtual machines.

19. The system of claim 11, wherein adjusting the setting is based on one or more of events, predictions, new models, the input, errors, and user-defined events.

20. The system of claim 11, wherein the one or more processors are further configured to:
  execute the model using the input received from the user computing device; and
  receive, from the model, a predicted outcome associated with the objective.

* * * * *